US012712654B1

(12) United States Patent
Sabbag

(10) Patent No.: US 12,712,654 B1
(45) Date of Patent: Aug. 18, 2026

(54) CLOCK SYNCHRONIZATION ACROSS NETWORK

(71) Applicant: Amazon Technologies, Inc., Seattle, WA (US)

(72) Inventor: Erez Sabbag, Koranit (IL)

(73) Assignee: Amazon Technologies, Inc., Seattle, WA (US)

( * ) Notice: Subject to any disclaimer, the term of this patent is extended or adjusted under 35 U.S.C. 154(b) by 477 days.

(21) Appl. No.: 18/343,080

(22) Filed: Jun. 28, 2023

(51) Int. Cl.
*H04J 3/06* (2006.01)

(52) U.S. Cl.
CPC .................................. *H04J 3/0661* (2013.01)

(58) Field of Classification Search
CPC .................................................... H04J 3/0661
See application file for complete search history.

(56) References Cited

U.S. PATENT DOCUMENTS

| | | | | |
|---|---|---|---|---|
| 2008/0247550 | A1* | 10/2008 | Kozaki | H04L 9/0891 380/278 |
| 2020/0084663 | A1* | 3/2020 | Park | H04W 8/08 |
| 2020/0178271 | A1* | 6/2020 | Shi | H04L 5/0092 |
| 2025/0317233 | A1* | 10/2025 | Gao | H04J 3/0661 |

OTHER PUBLICATIONS

IEEE Std 1588™-2008, (Revision of IEEE Std 1588-2002) (Year: 2008).*
IEEE Std 1588â¢-2008, (Revision of IEEE Std 1588-2002) (Year: 2008) (Year: 2008).*
"IEEE Standard for a Precision Clock Synchronization Protocol for Networked Measurement and Control Systems," in IEEE Std 1588-2019 (Revision of IEEE Std 1588-2008), Section 6: Clock synchronization model, Jun. 16, 2020, pp. 36-68.
Libri, A., et al., "Evaluation of NTP/PTP Fine-Grain Synchronization Performance in HPC Clusters," ANDARE '18: Proc. of the 2nd Workshop on Autotuning and aDaptivity AppRoaches for Energy efficient HPC Systems, Nov. 4, 2018, pp. 1-6.

* cited by examiner

*Primary Examiner* — Nizam U Ahmed
(74) *Attorney, Agent, or Firm* — Weaver Austin Villeneuve & Sampson LLP

(57) ABSTRACT

A local device sends a first packet to a remote device over a network that includes a first time stamp representing a time of transmission of the first packet at the local device based on a local clock. The local device receives from the remote device a second packet containing an acknowledgement for the first packet, further comprising the first time stamp, a second time stamp representing a time of reception of the first packet at the remote device based on a remote clock, and a third time stamp representing a time of transmission of the second packet based on the remote clock. A difference between the local clock and the remote clock can be computed based on the first, second, third time stamps, and a fourth time stamp representing a time of reception of the second packet at the local device based on the local clock.

20 Claims, 7 Drawing Sheets

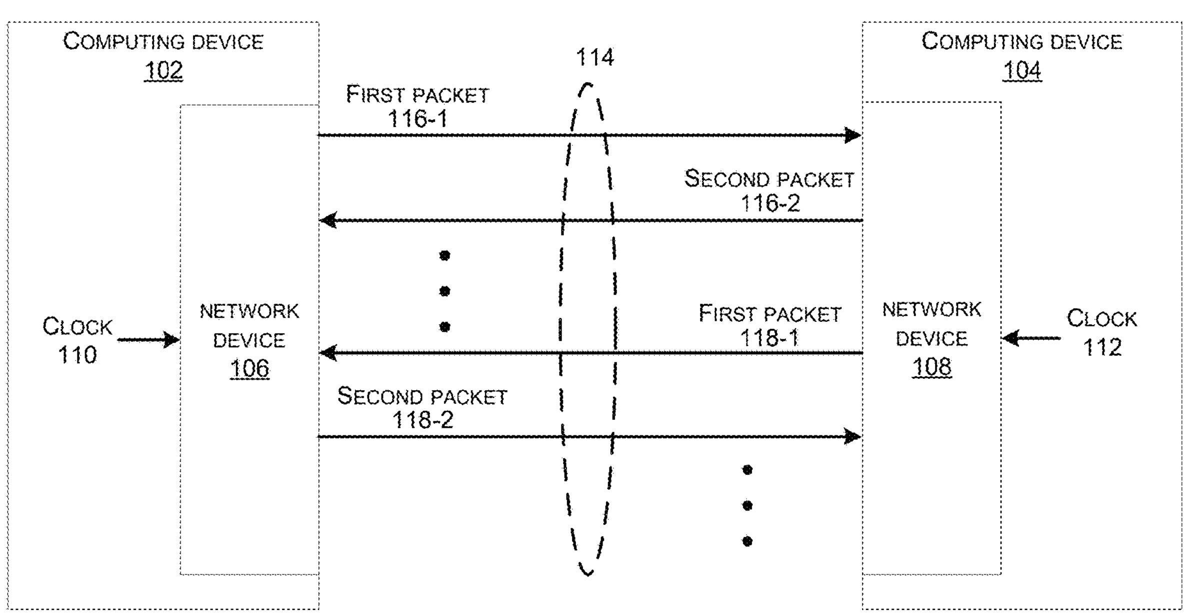
FIG. 1

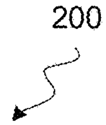

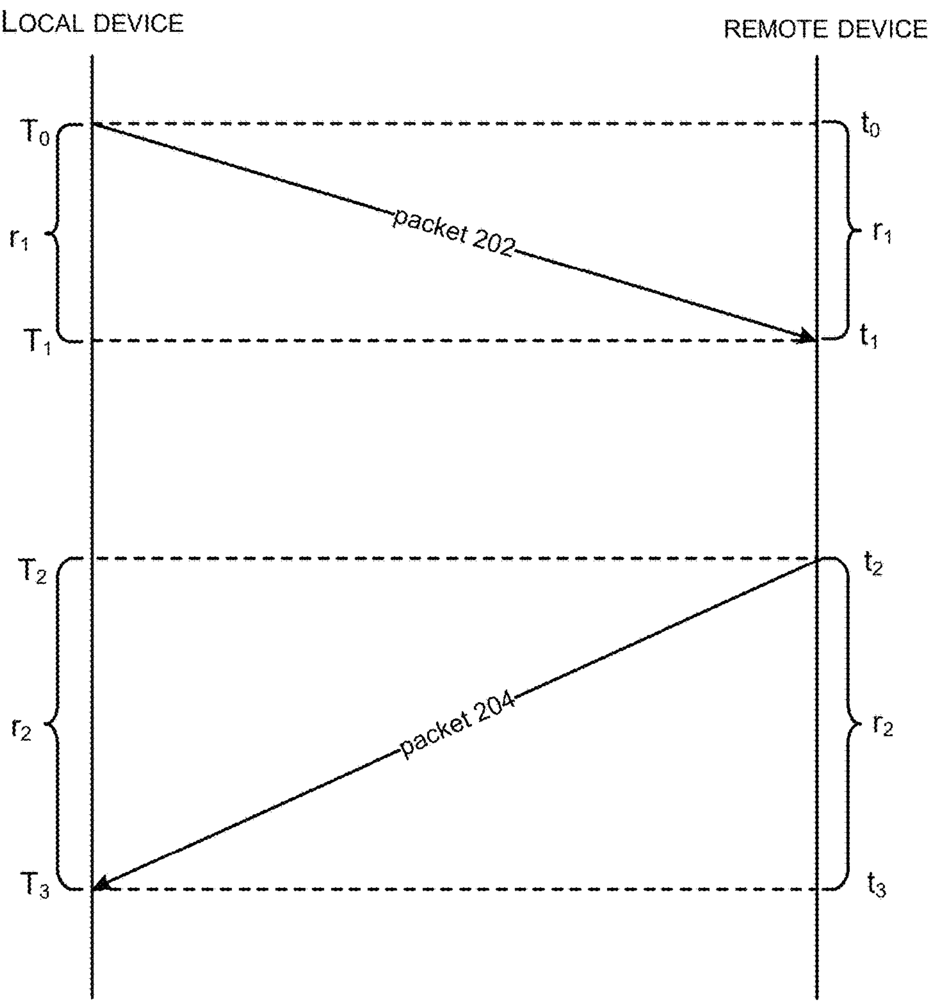

$T_0$ = time of transmission of packet 202 according to local clock of local device
$T_1$ = time of reception of packet 202 according to local clock of local device
$T_2$ = time of transmission of packet 204 according to local clock of local device
$T_3$ = time of reception of packet 204 according to local clock of local device
$t_0$ = time of transmission of packet 202 according to remote clock of remote device
$t_1$ = time of reception of packet 202 according to remote clock of remote device
$t_2$ = time of transmission of packet 204 according to remote clock of remote device
$t_3$ = time of reception of packet 204 according to remote clock of remote device
$r_1$ = trip time of packet 202
$r_2$ = trip time of packet 204

FIG. 2

$T_0$ = time of transmission of packet 202 according to local clock of local device
$t_1$ = time of reception of packet 202 according to remote clock of remote device
$t_2$ = time of transmission of packet 204 according to remote clock of remote device

500

SEND, FROM A LOCAL DEVICE, A FIRST PACKET TO A REMOTE DEVICE OVER A NETWORK. THE FIRST PACKET INCLUDES A FIRST TIME STAMP REPRESENTING A TIME OF TRANSMISSION OF THE FIRST PACKET AT THE LOCAL DEVICE BASED ON A LOCAL CLOCK OF THE LOCAL DEVICE
502

RECEIVE, FROM THE REMOTE DEVICE, A SECOND PACKET CONTAINING AN ACKNOWLEDGEMENT FOR THE FIRST PACKET. THE SECOND PACKET COMPRISES THE FIRST TIME STAMP, A SECOND TIME STAMP REPRESENTING A TIME OF RECEPTION OF THE FIRST PACKET AT THE REMOTE DEVICE BASED ON A REMOTE CLOCK OF THE REMOTE DEVICE, AND A THIRD TIME STAMP REPRESENTING A TIME OF TRANSMISSION OF THE SECOND PACKET BASED ON THE REMOTE CLOCK
504

COMPUTE A LOCAL TIME SHIFT ESTIMATE REPRESENTING A DIFFERENCE BETWEEN THE LOCAL CLOCK AND THE REMOTE CLOCK BASED ON THE FIRST TIME STAMP, THE SECOND TIME STAMP, THE THIRD TIME STAMP, AND A FOURTH TIME STAMP REPRESENTING A TIME OF RECEPTION OF THE SECOND PACKET AT THE LOCAL DEVICE BASED ON THE LOCAL CLOCK
506

DETERMINE AN OVERALL TIME SHIFT BETWEEN THE LOCAL CLOCK AND THE REMOTE CLOCK BASED ON A CUMULATIVE AVERAGE LOCAL TIME SHIFT COMPUTED FROM THE LOCAL TIME SHIFT ESTIMATE AND PREVIOUSLY COMPUTED LOCAL TIME SHIFT ESTIMATES
508

FIG. 5

CLOCK SYNCHRONIZATION ACROSS NETWORK

BACKGROUND

Computer networks generally include computing devices that can exchange traffic with each other via respective network interfaces. The computing devices may include processors, memory, accelerators, interconnects, network devices, and other suitable components based on the system specification. The computing devices may exchange packets over the network for different transactions based on a transport layer protocol such as Transmission Control Protocol (TCP), User Datagram Protocol (UDP), or Scalable Reliable Datagram (SRD).

BRIEF DESCRIPTION OF THE DRAWINGS

Various embodiments in accordance with the present disclosure will be described with reference to the drawings, in which:

FIG. 1 illustrates an example of a system comprising computing devices that may exchange traffic over a network using local clocks;

FIG. 2 illustrates an example timing diagram for transmission of a first packet and a second packet for a transaction between two devices;

FIG. 5 illustrates an example flow chart for a method performed by a local device to perform clock synchronization between a local clock and a remote clock, according to some embodiments;

DETAILED DESCRIPTION

Figure 3A:
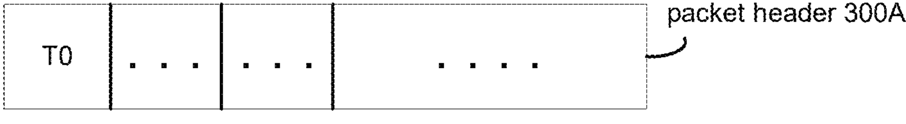
FIG. 3A illustrates an example of a packet header that includes a time stamp representing a time of transmission of a packet, according to some embodiments.

Computing devices in a network may exchange traffic using corresponding network devices or network interface cards. In various implementations, the network devices may exchange data and/or control packets for different transactions based on a transport layer protocol such as Transmission Control Protocol (TCP), User Datagram Protocol (UDP), or Scalable Reliable Datagram (SRD). For example, a transaction may include transmission of a data packet by a local device to a remote device over the network, and reception by the local device of an acknowledgement (ack) packet sent by the remote device in response to receiving the data packet. For implementations that utilize the SRD transport protocol, multiple network paths can be used to send packets of the same user/application flow over the network, which can reduce overall latency and improve reliability. Thus, if problems are seen (e.g., congestion on a particular path), paths can be quickly switched, and the packets may be retransmitted over a different path.

In some cases, each device (computing device or network device) may track the timings of the packets that are transmitted or received over the network to perform different measurements, which can be used for congestion control, debugging, or to improve performance. For example, the timings can be tracked by capturing time stamps in hardware and/or software using local clocks as the packets leave or enter the device. These time stamps can be used to estimate the round trip time (RTT) of a transaction from the transmitter (TX) side, and/or the processing time on the receiver (RX) side. For example, the RTT may include the time it takes for a packet to arrive from the TX side to the RX side, and the time it takes the TX side to receive an ack packet from the RX side. The packet may include any type of packet that is transmitted from the TX side to the RX side, e.g., a data packet, or a control packet, among others.

In most implementations, each device may capture the time stamps using a respective local clock that is not synced across the devices. For example, a local device on the TX side may capture a first time stamp using a local clock upon transmission of a data/control packet, and the remote device on the RX side may capture a second time stamp using a remote clock (i.e., local to the remote device) upon reception of the data/control packet at the remote device. Similarly, the remote device may capture a third time stamp using the remote clock upon transmission of an ack packet by the remote device, and the local device may capture a fourth time stamp using the local clock upon reception of the ack packet at the local device.

The first, second, third, and fourth time stamps can be used to estimate the RTT, and/or the processing time on the RX side. However, these time stamps are captured using the local clock and the remote clock that belong to different clock domains, and may not be synced or related to a shared clock. Some systems may rely on accurate measurements of the half RTTs for synchronizing the local and remote devices, debugging purposes, and/or for congestion control. For example, congestion control can be performed to transfer packets on a less congested path as determined by the half RTT values. However, congestion control cannot be performed efficiently if the half RTT values are not accurate due to out-of-sync clocks, which can impact the system performance.

Techniques described herein can provide systems and methods for clock synchronization across two devices that exchange traffic over a network using local clocks. In some embodiments, time stamps can be captured for each transaction that includes transmission of a data packet or a control packet from a local device to a remote device, and reception of an ack packet from the remote device for the transmitted packet. The time stamps can be used to estimate a time shift (time offset) between a local clock and a remote clock by computing a first elapsed time from a first time stamp representing a time of transmission of the data/control packet to a second time stamp representing a time of reception of the data/control packet for a one-way trip, and a second elapsed time from a third time stamp representing a time of transmission of an acknowledgement packet to a fourth time stamp representing a time of reception of the acknowledgement packet for a return one-way trip. Half of a difference between the first elapsed time and the second elapsed time can be computed for each transaction from a set of transactions, which can converge to a time shift value using a cumulative average approach. Accuracy of the time shift value can be further improved by averaging the time shift values computed by the local device and the remote device.

For example, the first, second, third, and fourth time stamps for a transaction started by the local device can be used by the local device to calculate a local time shift estimate representing a difference between the local clock and the remote clock. A cumulative average local time shift can be computed from a set of local time shift estimates that are computed for a set of transactions initiated by the local device. Similarly, the first, second, third, and the fourth time stamps for a transaction started by the remote device can be used by the remote device to calculate a remote time shift estimate representing a difference between the remote clock and the local clock. A cumulative average remote time shift can be computed from a set of remote time shift estimates that are computed for a set of transactions initiated by the remote device. An overall time shift can be calculated based on an average of the cumulative average local time shift and the cumulative average remote time shift. The overall time shift can be used to synchronize the local clock to the remote clock so that accurate values of the RTT, or the half RTT can be determined.

In various embodiments, the time shift values calculated by both the devices may need to be adjusted based on different factors, such as, sizes of different packets, network path used for transferring the packet, skew between the TX path and the RX path, and/or the processing time of generating the time stamps and packets. For example, on the TX side, the first time stamp may be generated by the local device before the first bit of the data/control packet is transmitted on the physical link, which may depend upon the size of the data/control packet. Similarly, on the RX side, the time stamp may be generated upon receiving the first bit of the data/control packet or a complete data/control packet. Additionally, the sizes of different packets may vary, e.g., sizes of different data packets may vary, or size of the data or control packets may be different than the size of the ack packets.

In some embodiments, when a multi-path transport protocol (e.g., SRD protocol) is used for packet transfers between the local device and the remote device, the skew between the TX path and the RX path may not converge to zero for a number of factors, such as, higher number of hops, large packets, or congested network. In such cases, the overall time shift estimation can be limited to samples with low RTT values to achieve higher accuracy. For example, computation of the cumulative average local time shift can exclude local time shift estimates corresponding to the RTT values above a threshold percentile (e.g., exclude RTT values above 10% percentile). In some embodiments, the overall time shift estimation can be limited to samples with smaller packet sizes to achieve higher accuracy. For example, computation of the cumulative average local time shift can exclude local time shift estimates corresponding to the samples with packet sizes above a threshold packet size (e.g., exclude packets with packet sizes greater than 1 KB or 2 KB). The overall time shift estimation can be updated by re-estimating at a periodic interval, continuously, or based on a weighted sum of previously determined overall time shifts, which can compensate for jitter between the local clock and the remote clock.

Thus, various embodiments can be used to synchronize the clocks on two devices across the network that can provide more accurate measurements, and improve system performance. For example, the accurate values of the RTT or the half RTT can be used by the congestion control algorithms to improve congestion. Some embodiments can be used for higher level applications (e.g., high performance computing (HPC) or distributed machine learning) executing on a cluster of nodes (e.g., computers or servers) that can rely on synchronized clocks to synchronize various events. For example, using synchronized clocks can minimize the number of messages that need to be communicated among the cluster nodes to start or end certain tasks, which can reduce the traffic across the network and improve overall performance.

In the following description, various embodiments will be described. For purposes of explanation, specific configurations and details are set forth in order to provide a thorough understanding of the embodiments. However, it will also be apparent to one skilled in the art that the embodiments may be practiced without the specific details. Furthermore, well-known features may be omitted or simplified in order not to obscure the embodiments being described.

FIG. 1 illustrates an example of a system 100 comprising computing devices that may exchange traffic over a network using local clocks.

Each computing device may be configured to perform transactions with another computing device over the network using a respective network device. For example, a transaction may include transmission of a first packet from a local network device using a local clock to a remote network device over a network, and reception of a second packet sent by the remote network device using a remote clock to acknowledge the first packet. The first packet can be a data packet containing payload for a transaction, or a control packet that may be sent to establish a network connection between the devices or to exchange other control messages between the devices. The second packet may contain an acknowledgement (ack) for the first packet, which can be a standalone ack, an aggregated ack, or an ack that is piggybacked on a data packet. In various implementations, the computing devices can be integrated circuit devices that may include a combination of processors, memory, interconnects, accelerators (e.g., graphics processing units, neural network accelerators, cryptographic accelerators, etc.), or direct memory access (DMA) controllers, among other suitable components. The computing devices can be implemented using system-on-chips (SoCs), field programmable gate arrays (FPGAs), or other suitable integrated circuits.

The example system 100 may comprise a computing device 102 and a computing device 104 configured to perform transactions over a network 114 using a network device 106 and a network device 108, respectively. The network device 106 and the network device 108 may exchange data and control packets with one another over the network 114 using a local clock 110 and a local clock 112, respectively. In one example, the network device 106 may operate as a local device that sends a first packet 116-1 using the local clock 110 to the network device 108 operating as the remote device. The first packet 116-1 can be a data packet containing a payload for a transaction, or a control packet. In some examples, the control packet can be used to exchange messages between the devices, e.g., related to establishing a network connection between the devices. The network device 108 may send a second packet 116-2 using the clock 112 to the network device 106 containing an ack for the first packet 116-1.

In another example, the network device 108 may operate as a local device that sends a first packet 118-1 using the local clock 112 to the network device 106 operating as the remote device. The first packet 118-1 can be a data packet containing a payload for a transaction, or a control packet. The network device 106 may send a second packet 118-2 using the clock 110 to the network device 108 containing an ack for the first packet 118-1. Multiple such packets can be exchanged between the network devices 106 and 108 in different orders. In some implementations, the ack in the second packet may correspond to an aggregated ack for a set of data packets, e.g., one ack packet can be sent for a set of data packets (every 4 or 8 data packets), and the RTT estimation can be performed using any data packet of the set of data packets acknowledged by the ack packet. In some implementations, the ack in the second packet may be piggybacked on a data packet sent by the remote device for another transaction.

In some cases, measurement of the RTT for a transaction between two devices can be critical. For example, the RTT can be used for debugging, and/or effective and stable congestion control. As an example, the network 114 may support the SRD transport protocol (also called the Relaxed Reliable Datagram (RRD) transport protocol), which can enable the use of multiple paths to send packets of the same user/application flow in parallel over the network 114. Using multiple paths in parallel can enable the spreading of packets of a given flow onto different paths to reduce overall latency and improve reliability. Thus, if problems are seen (e.g., congestion on a particular path), paths can be quickly switched, and the packets may be retransmitted over a different path. For example, the packets may be re-transmitted on a path with lower RTT that indicates less congestion in comparison to the paths with higher RTT. Thus, accurate measurements of the RTT for traffic between any two devices across the network 114 is desirable, which can be used to improve system performance.

In some implementations, the RTT can be estimated using time stamps as the packets leave or enter the network devices. For example, a first time stamp can be recorded using the clock 110 as the first packet 116-1 leaves the network device 106, and a second time stamp can be recorded using the clock 112 as the first packet 116-1 enters the network device 108. Similarly, a third time stamp can be recorded using the clock 112 as the second packet 116-2 leaves the network device 108, and a fourth time stamp can be recorded using the clock 110 as the second packet 116-2 enters the network device 106. In another example, a first time stamp can be recorded using the clock 112 as the first packet 118-1 leaves the network device 108, and a second time stamp can be recorded using the clock 110 as the first packet 118-1 enters the network device 106. Similarly, a third time stamp can be recorded using the clock 110 as the second packet 118-2 leaves the network device 106, and a fourth time stamp can be recorded using the clock 112 as the second packet 118-2 enters the network device 108. The time stamps can be captured by the device hardware or the software from the local clock used by the device.

The clocks 110 and 112 may be running at the same frequency or at different frequencies based on the system specification. However, in most cases, the clock 110 and the clock 112 are not synchronized with one another, or are not associated with a shared clock. Thus, a time shift may exist between the clocks on the network devices 106 and 108. However, each of the network devices 106 and 108 may not be aware of the time shift of the remote clock with respect to the local clock. In some cases, knowing the time shift between the local clock and the remote clock can be useful to correlate events happening on the local device as well as on the remote device, e.g., issues associated with the network or higher applications executing on the computing devices 102 and 104. The time shift can be used to synchronize the clocks 110 and 112 so that the RTT or the half RTT (one-way trip time) can be calculated accurately for congestion control or debugging, among other uses. In some higher levels applications, such as, HPC or distributed machine learning, clock synchronization among the nodes in a cluster can help minimize the number of messages that need to be communicated among the nodes to start or end certain tasks, which can improve system performance and efficiency.

Some embodiments can be used to perform clock synchronization between a local device and a remote device over a network based on an overall time shift between the local clock and the remote clock. The overall time shift can be computed based on an average of the cumulative average local time shift determined by the local device corresponding to a set of packets for transactions initiated by the local device, and a cumulative average remote time shift determined by the remote device corresponding to a set of packets for transactions initiated by the remote device. For example, the local device may compute the cumulative average local time shift from a set of local time shift estimates, and the remote device may compute the cumulative average remote time shift from a set of remote time shift estimates.

A local time shift estimate may represent a difference between the local clock and the remote clock, and may be computed by the local device based on the first, second, third, and the fourth time stamps for a transaction initiated by the local device that includes transmission of a data/control packet and reception of an ack packet. A remote time shift estimate may represent a difference between the remote clock and the local clock, and may be computed by the remote device based on the first, second, third, and the fourth time stamps for a transaction initiated by the remote device that includes transmission of a data/control packet and reception of an ack packet. This is further described with reference to FIG. 2.

FIG. 2 illustrates an example timing diagram 200 for transmission of a first packet and a second packet for a transaction between two devices. The first packet can be a data packet or a control packet, and the second packet can be a data packet or a control packet.

As an example, a first packet 202 can be transmitted from a local device to a remote device over a network, and a second packet 204 can be transmitted from the remote device to the local device over the network upon reception of the first packet 202. The first packet 202 can be a data packet or a control packet, and the second packet 204 can include an ack for the first packet 202. For example, the first packet 202 can be the first packet 116-1 transmitted by the network device 106 over the network 114 to the network device 108, or the first packet 202 can be the first packet 118-1 transmitted by the network device 108 over the network 114 to the network device 106. Similarly, the second packet 204 can be the second packet 116-2 transmitted by the network device 108 over the network 114 to the network device 106 upon reception of the first packet 116-1, or the second packet 204 can be the second packet 118-2 transmitted by the network device 106 over the network 114 to the network device 108 upon reception of the first packet 118-1.

As described previously, the first, second, third, and fourth time stamps can be captured as the first packet 202 is transmitted by the local device and is received by the remote device, and as the second packet 204 is transmitted by the remote device and is received by the local device. For example, as shown in FIG. 2, a time stamp $T_0$ may represent a time of transmission of the first packet 202 based on the local clock of the local device. The time stamp $T_0$ can be transmitted as part of the first packet 202 to the remote device. In various implementations, the time stamp $T_0$ can be part of the packet header based on the protocol supported by the network 114, e.g., the SRD protocol, the IPV4 protocol, or the IPV6 protocol, or inserted in a different field of the packets. As shown in FIG. 2, a time $t_0$ on the remote device may correspond to the time stamp $T_0$ on the local device.

The first packet 202 may be received by the remote device, and a time stamp $t_1$ can be captured that may represent a time of reception of the first packet 202 at the remote device based on a remote clock of the remote device. As shown in FIG. 2, a time $T_1$ on the local device may correspond to the time stamp $t_1$ on the remote device.

The first packet 202 may be processed by the remote device based on the type of transaction before transmitting the second packet 204. The second packet 204 can be transmitted to the local device in response to receiving the first packet 202, and a time stamp $t_2$ can be captured that may represent a time of transmission of the second packet 204 based on the remote clock. The time stamps $T_0$, $t_1$, and $t_2$ can be transmitted as part of the second packet 204 to the local device. For example, the time stamps $T_0$, $t_1$, and $t_2$ can be part of the packet header based on the protocol, or can be inserted in certain fields of the packet. As shown in FIG. 2, a time $T_2$ on the local device may correspond to the time stamp $t_2$ on the remote device.

The second packet 204 may be received by the local device, and a time stamp $T_3$ can be captured that represents a time of reception of the second packet 204 at the local device based on the local clock. In some implementations, the second packet 204 may include an ack for the first packet 202 that is an aggregated ack for a set of data packets that were received by the remote device. In such cases, the time stamps $T_0$, and $t_1$ used for computing the time shift can be captured for any data packet from the set of data packets, as long as it is consistent for all the computations. In some implementations, the second packet 204 can be a data packet sent by the remote device for another transaction, and the ack for the first packet 202 is piggybacked on this data packet. As shown in FIG. 2, a time $t_3$ on the remote device may correspond to the time stamp $T_3$ on the local device.

FIG. 3A illustrates an example of a packet header 300A that includes a time stamp representing a time of transmission of a packet, according to some embodiments.

The packet header 300A may include the time stamp $T_0$ representing the time of transmission of the first packet 202 based on the local clock of the local device, as described with reference to FIG. 2. The packet header 300A can be part of the first packet 202 based on the protocol supported by the network 114.

Figure 3B:
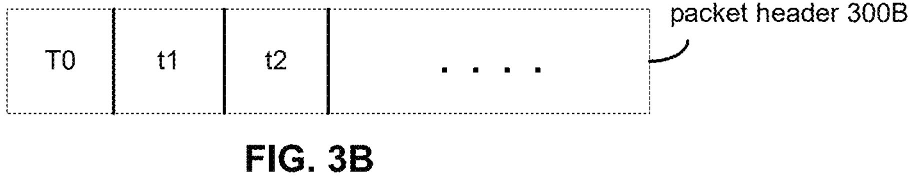
FIG. 3B illustrates an example of a packet header that includes time stamps representing time of transmission and reception of packets, according to some embodiments.

FIG. 3B illustrates an example of a packet header 300B that includes time stamps representing time of transmission and reception of packets, according to some embodiments.

The packet header 300B may include the time stamp $T_0$, the time stamp $t_1$ representing the time of reception of the first packet 202 at the remote device based on the remote clock of the remote device, and the time stamp $t_2$ representing the time of transmission of the acknowledgement based on the remote clock, as described with reference to FIG. 2. The packet header 300B can be part of the second packet 204 based on the protocol supported by the network 114. In various implementations, the time stamps $T_0$, $t_1$, and $t_2$ can be exchanged via packet fields that are already reserved for different time stamps, or are an extension to the existing header fields.

Referring back to FIG. 2, the time stamps $T_0$, $t_1$, $t_2$, and $T_3$ can be used to calculate a difference (offset or time shift) between the local clock and the remote clock, which can be used to synchronize the local clock with the remote clock. For example, the local clock and the remote clock may differ by an unknown constant A representing a time shift value, therefore:

$$T_i=t_i+\Delta,\ \Delta\epsilon Z. \quad \text{equation (1)}$$

As an example, referring back to FIG. 2, A may represent the difference between the $T_0$ and $t_0$, $T_1$ and $t_1$, $T_2$ and $t_2$, and $T_3$ and $t_3$.

According to some embodiments, one-way trip times (or half RTT) represented by $r_1$ and $r_2$ in FIG. 2 can be calculated based on the time stamps $T_0$, $t_1$, $t_2$, and $T_3$. For example, as shown in FIG. 2, $r_1$ may represent a first elapsed time from the time stamp $T_0$ to the time stamp $t_1$, and $T_2$ may represent a second elapsed time from the time stamp $t_2$ to the time stamp $T_3$, and can be defined as:

$$r_1=t_1-t_0=T_1-T_0 \quad \text{equation (2)}$$

$$r_2=t_3-t_2=T_3-T_2 \quad \text{equation (3)}$$

Equations (2) and (3) can be used to derive:

$$t_1-T_0=t_1-(t_0+\Delta)=r_1-\Delta, \quad \text{equation (4)}$$

$$T_3-t_2=t_3+\Delta-t_2=r_2+\alpha. \quad \text{equation (5)}$$

Net RTT (without including the processing time by the receiving device) can be calculated by adding equations (4) and (5) as shown below:

$$Net\ RTT=(t_1-T_0)+(T_3-t_2)=r_1-\Delta+r_2+\Delta=r_1+r_2. \quad \text{equation (6)}$$

The equations (4) and (5) can be subtracted and divided by 2 to determine half of a difference between $r_1$ and $r_2$ to compute a local time shift estimate D, as shown below:

$$D=\frac{(T_3-t_2)-(t_1-T_0)}{2}=\frac{r_2+\Delta-r_1+\Delta}{2}=\frac{r_2-r_1}{2}+\Delta. \quad \text{equation (7)}$$

In some examples, the data packets can be of variable size (or length), e.g., different data packets can be of different sizes containing different number of bytes. In some implementations, the time stamp $t_1$ may be captured when the entire first packet 202 has been received by the remote device, and, therefore, $r_1$ needs to be adjusted based on the size of each packet and a reception bandwidth of the remote device. If K is the size (e.g., in bytes) of the packet, and B is the reception rate (e.g., in bytes/sec) at the remote device, the corrected $r_1$ can be expressed as:

$$\hat{r1}=r1-\frac{K}{B}. \quad \text{equation (8)}$$

In some implementations, there may be a latency between capturing the time stamp $T_0$ for the first packet 202 and transmitting a first bit of the first packet 202 onto the network 114, which can vary based on the length of the first packet 202. If $T_{SF}$ represents the latency between recording the time stamp $T_0$ for the first packet 202 and transmitting the first bit of the first packet 202, $r_1$ can also be corrected as shown below:

$$\widehat{r1}=r1+T_{SF}. \quad \text{equation (9)}$$

In some embodiments, a skew S between the paths taken by the first packet 202 (e.g., TX path) and the second packet 204 (e.g., RX path) can be a random variable, which can be defined as:

$S=(r2-\widehat{r1})$, with the assumption that the expected value of S, E{S}~0. For example, Central Limit Theorem (CLT) can assure that the following holds:

$$\frac{1}{n}\sum_{i=1}^{n} S_i \xrightarrow{n\to\infty} E\{S\} \approx 0. \quad \text{equation (10)}$$

Based on the equation (10), it can be assumed that a cumulative average of D may converge to the time shift value Δ. In some embodiments, a cumulative average local time shift can be computed by the local device from a set of local time shift estimates. Each local time shift estimate can be computed using the equation (7). In some implementations, estimating the time shift value can be achieved using cumulative average approach, as shown below:

$$\hat{\Delta}_{k+1} = \hat{\Delta}_k + \frac{D_{k+1} - \hat{\Delta}_k}{k+1}, \text{ where,} \quad \text{equation (11)}$$

$$D_k = \frac{1}{2}[T_3 - t_2 - t_1 + T_0], \text{ and } \hat{\Delta}_1 = D_1.$$

However, the cumulative average can be computed using any suitable approach, e.g., holding the last N samples, moving average, or the brute force approach, without deviating from the scope of the disclosure.

In some examples, the remote device may also compute its own time shift estimates using similar data/control, and ack packets, and the difference between the local clock and the remote clock computed by the remote device may be opposite (e.g., negative value) of the difference between the local clock and the remote clock computed by the local device. Thus, to further improve the accuracy and mitigate asymmetric cases, where E{|S|}>0, an overall time shift can be computed based on an average of the cumulative average local time shift and a cumulative average remote time shift determined by the remote device. For example, an average of the estimation on the TX side and the RX side can be calculated as follows:

$$\hat{\Delta}_k = \frac{\hat{\Delta}_k^{TX} + \hat{\Delta}_k^{RX}}{2}. \quad \text{equation (12)}$$

As an example, suppose the expected value, $E\{r_1-r_2\}=\delta$ due to asymmetric skew, which can arise from the incast traffic. For example, in some cases, a large number of packets may be transmitted, which can cause congestion on the TX path. In such cases, $r_1$ may be larger than $r_2$. Therefore, the time shift estimations computed by both the local device and the remote device are considered to determine an overall time shift. For example, the overall time shift can be calculated based on an average of the cumulative average local time shift and a cumulative average remote time shift determined by the remote device, as shown below:

$$\hat{\Delta} = \frac{\frac{\delta}{2} + \Delta - \frac{\delta}{2} + \Delta}{2} = \Delta. \quad \text{equation (13)}$$

In some implementations, the cumulative average remote time shift determined by the remote device can be sent to the local device as part of the packet. For example, the cumulative average remote time shift can be part of the packet header 300B. In various embodiments, the overall time shift can be re-estimated continuously, at a periodic interval, or based on a weighted sum of previously determined overall time shifts to synchronize the local and remote clocks, which can compensate for the jitters between the local clock and the remote clock. For example, the weighted sum can be calculated by multiplying each previously computed overall time shift by weights (or constants) that are determined based on the packet sizes, RTT times, packet type, or transport protocol, among other factors. In some examples, the Δ can be adjusted if the local clock and the remote clock are running at different frequencies by scaling (e.g., multiplying or dividing) the timestamps with a constant representing a ratio of the frequencies. In some examples, different frequencies used by the local device and the remote device can be exchanged during establishment of the network connection, or shared by the control plane, and the lower frequency of the different frequencies can be used as the base frequency for computing the time shifts.

When the multi-path transport protocol is used to transfer the packets from the local device to the remote device, the packets may be transmitted via different paths, which may result in higher or lower RTT values based on the network congestion, size of the packets, or number of hops. In some embodiments, the cumulative average local time shift may be computed by excluding local time shift estimates corresponding to RTT values above a threshold percentile to provide a more accurate estimation. For example, all the local time shift estimates with the RTT values in the top 90% percentile can be excluded, and only lower 10% percentile RTT values are considered for calculating the cumulative average local time shift for better accuracy. In some implementations, the RTT values that are in the lower 10% percentile can be determined based on the average or mean RTT value, and the lowest and highest RTT values. In some embodiments, more accurate estimation can be provided by computing the local time shift estimates only for packets that are smaller than a threshold packet size, e.g., 1 KB, 2 KB, etc.

Figure 4:
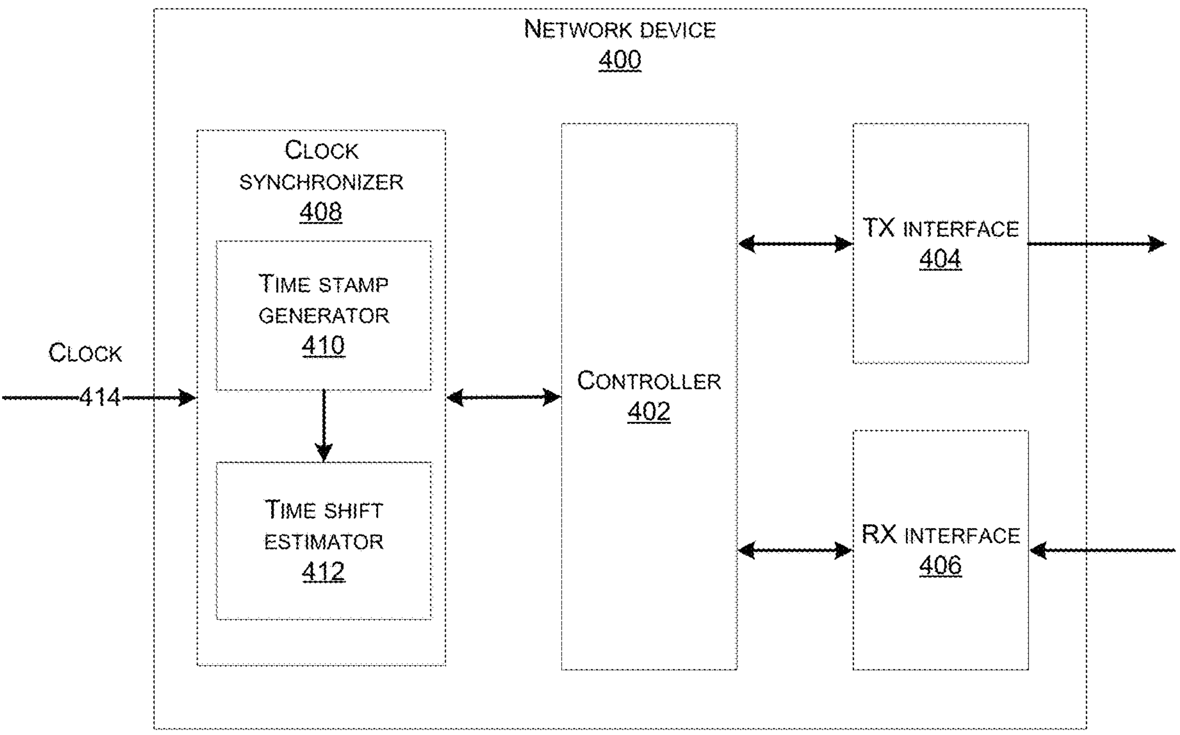
FIG. 4 illustrates an example block diagram of a network device configured to perform clock synchronization between a local clock and a remote clock, according to some embodiments.

FIG. 4 illustrates an example block diagram of a network device 400 configured to perform clock synchronization between a local clock and a remote clock, according to some embodiments. The network device 400 can be an integrated circuit device, and can be part of a computing device, e.g., a server or a processing node.

The network device 400 can be an example of the network device 106 and the network device 108 in FIG. 1. In some examples, the local device and the remote device in FIG. 2 are examples of the network device 400. The network device 400 may include a controller 402, a transmitter (TX) interface 404, a receiver (RX) interface 406, and a clock synchronizer 408. The clock synchronizer 408 may include a time stamp generator 410, and a time shift estimator 412. The time stamp generator 410 and the time shift estimator 412 can be implemented, for example, using circuitry or integrated circuit components. The network device 400 may also include additional or different components to implement the intended functionality, which are not described here for the ease of explanation.

The controller 402 may be configured to provide support for various components to implement the intended functionality of the network device, as well as the interfaces for communication with the relevant components (e.g., processors, memory, etc.) of the computing device. The controller 402 can be implemented using circuitry or integrated circuit components, and may provide control signals to the clock synchronizer 408, the TX interface 404, and the RX interface 406 to manage the transaction flow with the remote device. The controller 402 may be implemented using one or more of a processor, memory, state machines, or any suitable integrated circuits. In some implementations, controller 402 can execute program code stored in a memory to perform the time shift estimations described herein.

The TX interface 404 may be configured to provide a network interface for transmission of packets over the network using a suitable protocol. For example, the TX interface 404 can be used for transmission of the data packets, control packets, or the ack packets to the remote device via the network 114. The TX interface 404 may include buffers, queues, media access control (MAC), DMA engine, physical link (PHY) interface, or other suitable components based on the implementation.

The RX interface 406 may be configured to provide a network interface for reception of packets over the network using a suitable protocol. For example, the RX interface 406 can be used for the reception of the data packets, control packet, or the ack packets from the remote device via the network 114. The RX interface 406 may include buffers, queues, media access control (MAC), DMA engine, physical link (PHY) interface, or other suitable components based on the implementation.

The time stamp generator 410 can be used to generate the time stamps for the packets as they enter or leave the network device 400. For example, the time stamp generator 410 can be used to generate the first time stamp and the fourth time stamp when the network device 400 is operating as the local device, or the second time stamp and the third time stamp when the network device 400 is operating as the remote device. In some implementations, the time stamps can be generated from a clock 414 (e.g., running a counter) used by the network device 400, and added to or inserted into the header of the data/control packet, similar to the packet header 300A, or to the header of the ack packet, similar to the packet header 300B. For example, the clock 414 can be the clock 110 or the clock 112 in FIG. 1. The time stamp generator 410 can also include or have access to registers (or memory) to store the time stamps (e.g., the time stamp $T_3$), threshold percentile value, periodic interval value for computing the overall time shift, local time shift estimates to compute the cumulative average local time shift, and cumulative remote time shift values to compute the overall time shift, among others.

The time shift estimator 412 may be configured to compute a local time shift estimate representing a difference between the local clock and the remote clock based on the first time stamp, the second time stamp, the third time stamp, and the fourth time stamp. For example, the time shift estimator 412 can be used to compute a local time shift estimate D for each transaction based on the time stamps $T_0$, $t_1$, $t_2$, and $T_3$, as described by the equation (7). The time shift estimator 412 can also be used to compute a cumulative average local time shift from a set of local time shift estimates computed for a set of transactions, for example, as described by the equation (11).

The time shift estimator 412 may also be configured to determine an overall time shift between the local clock and the remote clock based on a cumulative average local time shift computed from the local time shift estimate and previously computed local time shift estimates. For example, the time shift estimator 412 can also be used to compute an overall time shift, as described by the equation (12). The time shift estimator 412 can also be used to adjust the $r_1$ based on the size of the data/control packet, the reception bandwidth (e.g., bytes/sec) of the remote device, or the latency $T_{SF}$, for example, as described by the equations (8) and (9). The adjusted values can be used to update the overall time shift. The time shift estimator 412 can also compensate for the difference in clock frequencies between the local clock and the remote clock by updating the overall time shift accordingly. In some implementations, the overall time shift can be updated continuously, or at a periodic interval based on a programmable value.

FIG. 5 illustrates an example flow chart 500 for a method performed by a local device to perform clock synchronization between a local clock and a remote clock, according to some embodiments. The local device can be the network device 106, the network device 108, or the network device 400.

In step 502, the method includes sending, from the local device, a first packet to a remote device over a network. The first packet can be a data packet, a control packet, or any suitable packet that is transmitted from the TX side of the local device. The first packet may include a first time stamp representing a time of transmission of the first packet at the local device based on a local clock of the local device. For example, the local device can be the network device 106, the remote device can be the network device 108, and the first time stamp can be the time stamp $T_0$. The first packet 116-1 can be the first packet 202 in FIG. 2 that includes the time stamp $T_0$ that was captured using the clock 110. The time stamp $T_0$ can be part of the packet header 300A for the first packet 202.

In step 504, the method includes receiving, from the remote device, a second packet containing an acknowledgement for the first packet. The second packet may further comprise the first time stamp, a second time stamp representing a time of reception of the first packet at the remote device based on a remote clock of the remote device, and a third time stamp representing a time of transmission of the second packet based on the remote clock. The first time stamp can be the time stamp $T_0$, the second time stamp can be the time stamp $t_1$, and the third time stamp can be time stamp $t_2$. For example, the second packet can be the second packet 204 in FIG. 2 that includes the time stamp $T_0$, the time stamp $t_1$ that represents a time of reception of the first packet 202 at the network device 108 based on the clock 112, and the time stamp $t_2$ that represents a time of transmission of the second packet 204 based on the clock 112. The time stamp $T_0$, the time stamp $t_1$, and the time stamp $t_2$ can be part of the packet header 300B for the second packet 204.

In step 506, the method includes computing a local time shift estimate representing a difference between the local clock and the remote clock based on the first time stamp, the second time stamp, the third time stamp, and a fourth time stamp representing a time of reception of the second packet at the local device based on the local clock. The fourth time stamp can be the time stamp $T_3$ representing a time of reception of the second packet 204 based on the clock 110. The time stamps $T_0$, $t_1$, $t_2$, and $T_3$ can be captured by the time stamp generator 410. The time shift estimator 412 can compute a local time shift estimate D representing a difference between the local clock 110 and the remote clock 112 based on the $T_0$, $t_1$, $t_2$, and $T_3$, for example, as described in equation (7). In some examples, the local time shift estimate D is further computed by adjusting the $r_1$, for example, as described in the equations (8) and (9).

In step 508, the method includes determining an overall time shift between the local clock and the remote clock based on a cumulative average local time shift computed from the local time shift estimate and previously computed local time shift estimates. The time shift estimator 412 can also compute the cumulative average local time shift, for example, as described in equation (11). In some implementations, the cumulative average local time shift may exclude local time shift estimates corresponding to RTT values above a threshold percentile, or corresponding to packet sizes above a threshold packet size. The overall time shift can be determined continuously, at a periodic interval, or updated based on a weighted sum of previously determined overall time shifts.

In some embodiments, the overall time shift can be determined by averaging the cumulative average local time shift and a cumulative average remote time shift determined by the remote device for further accuracy, for example, as described in equation (12). For example, the network device 106 can send the local overall time shift to the network device 108 as part of a header for the second packet 116-2, and the network device 108 can send the local overall time shift to the network device 106 as part of a header for the second packet 118-2. The network device 106 can synchronize the clock 110 to the remote clock 112 based on the average of the overall time shifts for both the devices, and the network device 108 can synchronize the clock 112 to the remote clock 110 based on the average of the overall time shifts for both the devices. Thus, accurate measurements can be performed with synchronized clocks, which can be used to improve system performance.

Figure 6:
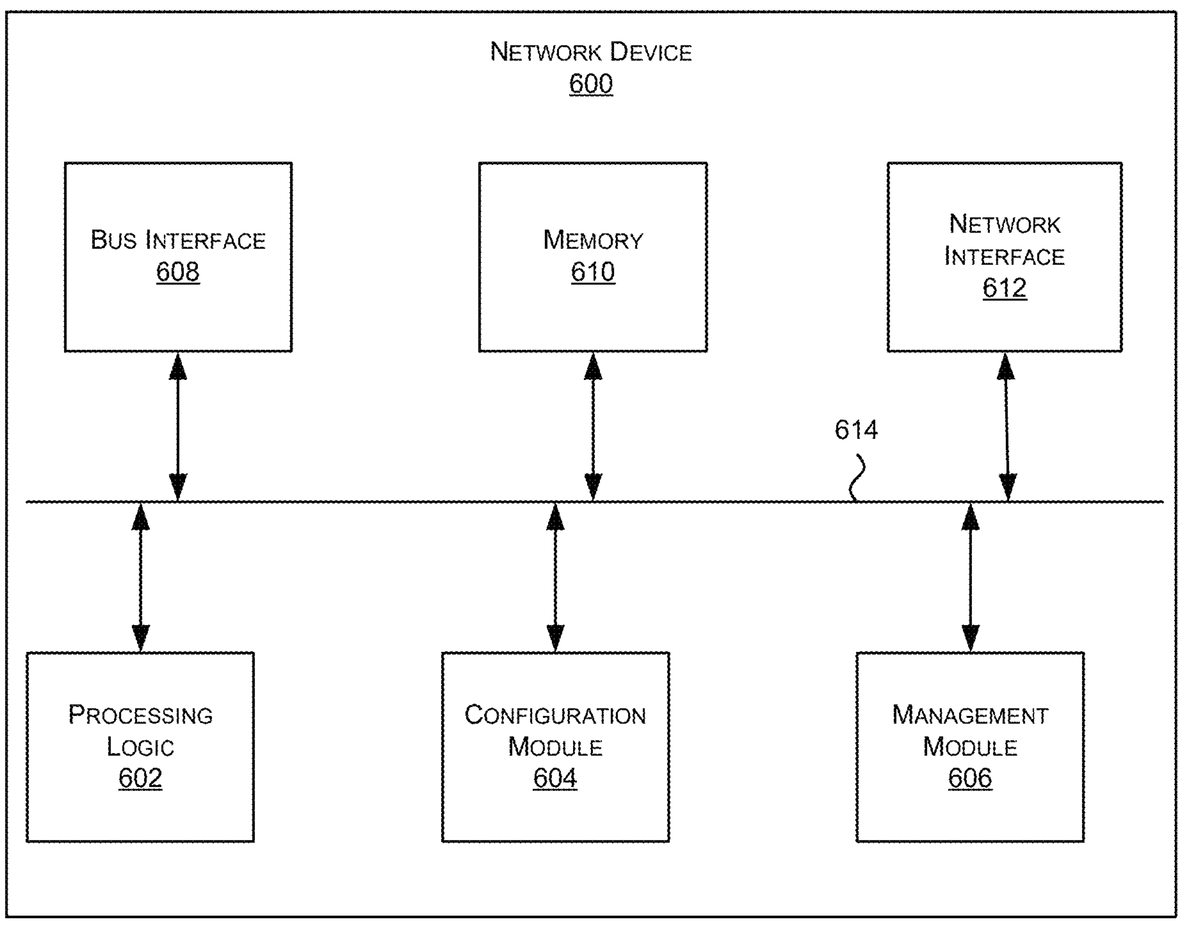
FIG. 6 illustrates an example of a network device, according to certain aspects of the disclosure.

FIG. 6 illustrates an example of a network device 600. Functionality and/or several components of the network device 600 may be used without limitation with other embodiments disclosed elsewhere in this disclosure, without limitations. In some embodiments, the network device 106, network device 108, or the network device 400 can include some or all the components/functionality of the network device 600. A network device 600 may facilitate processing of packets and/or forwarding of packets from the network device 600 to another device. As referred to herein, a "packet" or "network packet" may refer to a variable or fixed unit of data. In some instances, a packet may include a packet header and a packet payload. The packet header may include information associated with the packet, such as the source, destination, quality of service parameters, length, protocol, routing labels, error correction information, etc. In certain implementations, one packet header may indicate information associated with a series of packets, such as a burst transaction. In some implementations, the network device 600 may be the recipient and/or generator of packets. In some implementations, the network device 600 may modify the contents of the packet before forwarding the packet to another device. The network device 600 may be a peripheral device coupled to another computer device, a switch, a router or any other suitable device enabled for receiving and forwarding packets.

In one example, the network device 600 may include processing logic 602, a configuration module 604, a management module 606, a bus interface module 608, memory 610, and a network interface module 612. These modules may be hardware modules, software modules, or a combination of hardware and software. In certain instances, modules may be interchangeably used with components or engines, without deviating from the scope of the disclosure. The network device 600 may include additional modules, not illustrated here, such as components discussed with respect to the nodes disclosed in FIG. 7. In some implementations, the network device 600 may include fewer modules. In some implementations, one or more of the modules may be combined into one module. One or more of the modules may be in communication with each other over a communication channel 614. The communication channel 614 may include one or more busses, meshes, matrices, fabrics, a combination of these communication channels, or some other suitable communication channel.

The processing logic 602 may include application specific integrated circuits (ASICs), field programmable gate arrays (FPGAs), systems-on-chip (SoCs), network processing units (NPUs), processors configured to execute instructions or any other circuitry configured to perform logical arithmetic and floating point operations. Examples of processors that may be included in the processing logic 602 may include processors developed by ARM®, MIPS® AMD®, Intel®, Qualcomm®, and the like. In certain implementations, processors may include multiple processing cores, wherein each processing core may be configured to execute instructions independently of the other processing cores. Furthermore, in certain implementations, each processor or processing core may implement multiple processing threads executing instructions on the same processor or processing core, while maintaining logical separation between the multiple processing threads. Such processing threads executing on the processor or processing core may be exposed to software as separate logical processors or processing cores. In some implementations, multiple processors, processing cores or processing threads executing on the same core may share certain resources, such as for example busses, level 1 (L1) caches, and/or level 2 (L2) caches. The instructions executed by the processing logic 602 may be stored on a computer-readable storage medium, for example, in the form of a computer program. The computer-readable storage medium may be non-transitory. In some cases, the computer-readable medium may be part of the memory 610.

The memory 610 may include either volatile or non-volatile, or both volatile and non-volatile types of memory. The memory 610 may, for example, include random access memory (RAM), read only memory (ROM), Electrically Erasable Programmable Read-Only Memory (EEPROM), flash memory, and/or some other suitable storage media. In some cases, some or all of the memory 610 may be internal to the network device 600, while in other cases some or all of the memory may be external to the network device 600. The memory 610 may store an operating system comprising executable instructions that, when executed by the processing logic 602, provides the execution environment for executing instructions providing networking functionality for the network device 600. The memory may also store and maintain several data structures and routing tables for facilitating the functionality of the network device 600.

In some implementations, the configuration module 604 may include one or more configuration registers. Configuration registers may control the operations of the network device 600. In some implementations, one or more bits in the configuration register can represent certain capabilities of the network device 600. Configuration registers may be programmed by instructions executing in the processing logic 602, and/or by an external entity, such as a host device, an operating system executing on a host device, and/or a remote device. The configuration module 604 may further include hardware and/or software that control the operations of the network device 600.

In some implementations, the management module 606 may be configured to manage different components of the network device 600. In some cases, the management module 606 may configure one or more bits in one or more configuration registers at power up, to enable or disable certain capabilities of the network device 600. In certain implementations, the management module 606 may use processing resources from the processing logic 602. In other implementations, the management module 606 may have processing logic similar to the processing logic 602, but segmented away or implemented on a different power plane than the processing logic 602.

The bus interface module 608 may enable communication with external entities, such as a host device and/or other components in a computing system, over an external communication medium. The bus interface module 608 may include a physical interface for connecting to a cable, socket, port, or other connection to the external communication medium. The bus interface module 608 may further include hardware and/or software to manage incoming and outgoing transactions. The bus interface module 608 may implement a local bus protocol, such as Peripheral Component Interconnect (PCI) based protocols, Non-Volatile Memory Express (NVMe), Advanced Host Controller Interface (AHCI), Small Computer System Interface (SCSI), Serial Attached SCSI (SAS), Serial AT Attachment (SATA), Parallel ATA (PATA), some other standard bus protocol, or a proprietary bus protocol. The bus interface module 608 may include the physical layer for any of these bus protocols, including a connector, power management, and error handling, among other things. In some implementations, the network device 600 may include multiple bus interface modules for communicating with multiple external entities. These multiple bus interface modules may implement the same local bus protocol, different local bus protocols, or a combination of the same and different bus protocols.

The network interface module 612 may include hardware and/or software for communicating with a network. This network interface module 612 may, for example, include physical connectors or physical ports for wired connection to a network, and/or antennas for wireless communication to a network. The network interface module 612 may further include hardware and/or software configured to implement a network protocol stack. The network interface module 612 may communicate with the network using a network protocol, such as for example TCP/IP, Infiniband, RoCE, Institute of Electrical and Electronics Engineers (IEEE) 802.11 wireless protocols, User Datagram Protocol (UDP), Asynchronous Transfer Mode (ATM), token ring, frame relay, High Level Data Link Control (HDLC), Fiber Distributed Data Interface (FDDI), and/or Point-to-Point Protocol (PPP), among others. In some implementations, the network device 600 may include multiple network interface modules, each configured to communicate with a different network. For example, in these implementations, the network device 600 may include a network interface module for communicating with a wired Ethernet network, a wireless 802.11 network, a cellular network, an Infiniband network, etc.

The various components and modules of the network device 600, described above, may be implemented as discrete components, as a System on a Chip (SoC), as an ASIC, as an NPU, as an FPGA, or any combination thereof. In some embodiments, the SoC or other component may be communicatively coupled to another computing system to provide various services such as traffic monitoring, traffic shaping, computing, etc. In some embodiments of the technology, the SoC or other component may include multiple subsystems as disclosed with respect to FIG. 7.

Figure 7:
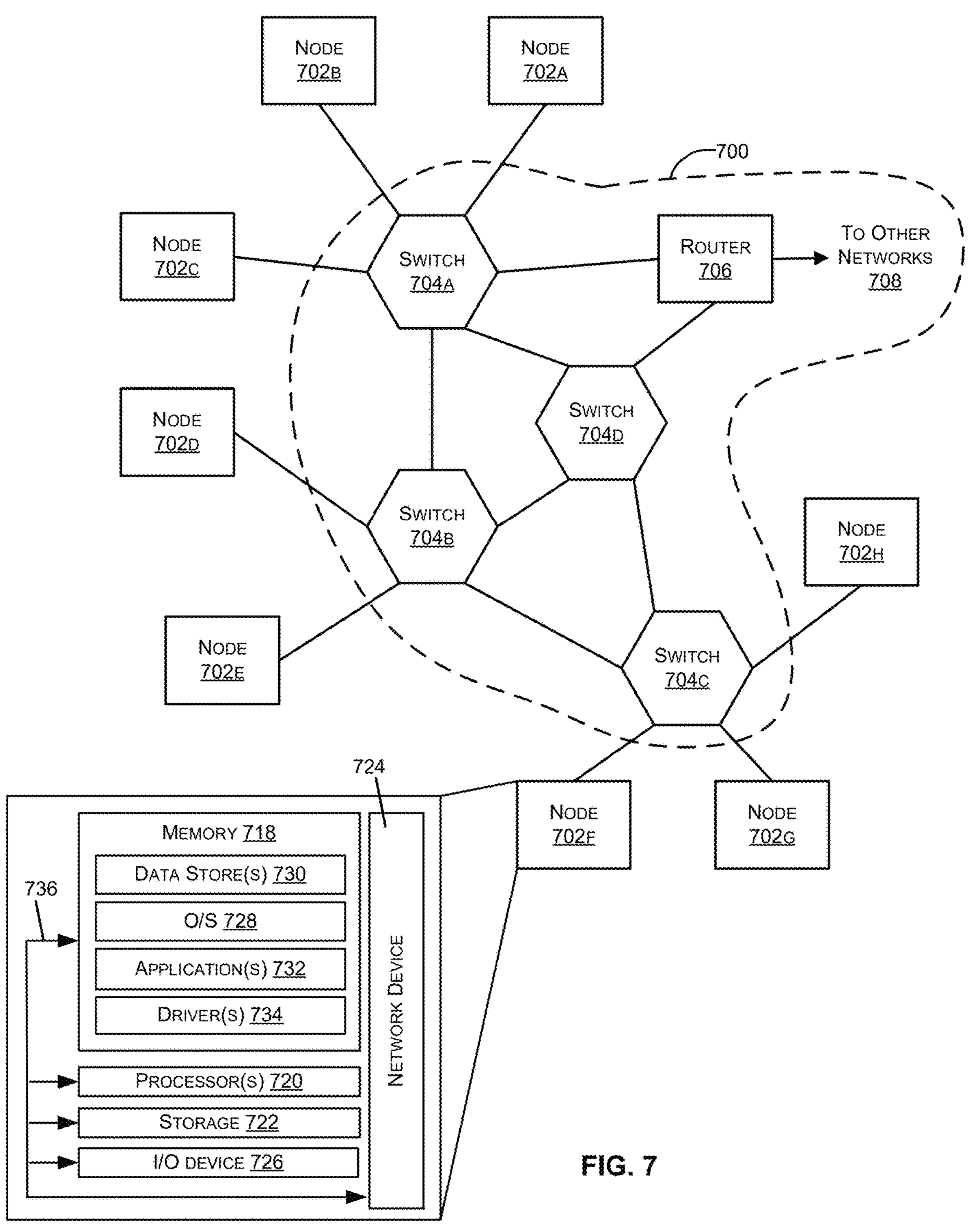
FIG. 7 illustrates an example architecture for features and systems described herein that includes one or more service provider computers and/or a user device connected via one or more networks, according to certain aspects of the disclosure.

FIG. 7 illustrates a network 700, illustrating various different types of network devices 600 of FIG. 6, such as nodes comprising the network device, switches and routers. In certain embodiments, the network 700 may be based on a switched architecture with point-to-point links. As illustrated in FIG. 7, the network 700 includes a plurality of switches 704*a*-704*d*, which may be arranged in a network. In some cases, the switches are arranged in a multi-layered network, such as a Clos network. A network device 600 that filters and forwards packets between local area network (LAN) segments may be referred to as a switch. Switches generally operate at the data link layer (layer 2) and sometimes the network layer (layer 3) of the Open System Interconnect (OSI) Reference Model and may support several packet protocols. Switches 704*a*-704*d* may be connected to a plurality of nodes 702*a*-702*h* and provide multiple paths between any two nodes.

The network 700 may also include one or more network devices 600 for connection with other networks 708, such as other subnets, LANs, wide area networks (WANs), or the Internet, and may be referred to as routers 706. Routers use headers and forwarding tables to determine the best path for forwarding the packets, and use protocols such as internet control message protocol (ICMP) to communicate with each other and configure the best route between any two devices.

In some examples, network(s) 700 may include any one or a combination of many different types of networks, such as cable networks, the Internet, wireless networks, cellular networks and other private and/or public networks. Interconnected switches 704*a*-704*d* and router 706, if present, may be referred to as a switch fabric, a fabric, a network fabric, or simply a network. In the context of a computer network, terms “fabric” and “network” may be used interchangeably herein.

Nodes 702*a*-702*h* may be any combination of host systems, processor nodes, storage subsystems, and I/O chassis that represent user devices, service provider computers or third party computers. In some embodiments, the computing devices 102 or 104 can be one of the nodes 702*a*-702*h*.

User devices may include computing devices to access an application 732 (e.g., a web browser or mobile device application). In some aspects, the application 732 may be hosted, managed, and/or provided by a computing resources service or service provider. The application 732 may allow the user(s) to interact with the service provider computer(s) to, for example, access web content (e.g., web pages, music, video, etc.). The user device(s) may be a computing device such as for example a mobile phone, a smart phone, a personal digital assistant (PDA), a laptop computer, a netbook computer, a desktop computer, a thin-client device, a tablet computer, an electronic book (e-book) reader, a gaming console, etc. In some examples, the user device(s) may be in communication with the service provider computer(s) via the other network(s) 708. Additionally, the user device(s) may be part of the distributed system managed by, controlled by, or otherwise part of the service provider computer(s) (e.g., a console device integrated with the service provider computers).

The node(s) of FIG. 7 may also represent one or more service provider computers. One or more service provider computers may provide a native application that is configured to run on the user devices, which user(s) may interact with. The service provider computer(s) may, in some examples, provide computing resources such as, but not limited to, client entities, low latency data storage, durable data storage, data access, management, virtualization, cloud-based software solutions, electronic content performance management, and so on. The service provider computer(s) may also be operable to provide web hosting, databasing, computer application development and/or implementation platforms, combinations of the foregoing or the like to the user(s). In some embodiments, the service provider computer(s) may be provided as one or more virtual machines implemented in a hosted computing environment. The hosted computing environment may include one or more rapidly provisioned and released computing resources. These computing resources may include computing, networking and/or storage devices. A hosted computing environment may also be referred to as a cloud computing environment. The service provider computer(s) may include one or more servers, perhaps arranged in a cluster, as a server farm, or as individual servers not associated with one another and may host the application 732 and/or cloud-based software services. These servers may be configured as part of an integrated, distributed computing environment. In some aspects, the service provider computer(s) may, additionally or alternatively, include computing devices such as for example a mobile phone, a smart phone, a personal digital assistant (PDA), a laptop computer, a desktop computer, a netbook computer, a server computer, a thin-client device, a tablet computer, a gaming console, etc. In some instances, the service provider computer(s), may communicate with one or more third party computers.

In one example configuration, the node(s) 702*a*-702*h* may include at least one memory 718 and one or more processing units (or processor(s) 720). The processor(s) 720 may be implemented in hardware, computer-executable instructions, firmware, or combinations thereof. Computer-executable instruction or firmware implementations of the processor(s) 720 may include computer-executable or machine-executable instructions written in any suitable programming language to perform the various functions described.

In some instances, the hardware processor(s) 720 may be a single core processor or a multi-core processor. A multi-core processor may include multiple processing units within the same processor. In some embodiments, the multi-core processors may share certain resources, such as buses and second or third level caches. In some instances, each core in a single or multi-core processor may also include multiple executing logical processors (or executing threads). In such a core (e.g., those with multiple logical processors), several stages of the execution pipeline and also lower level caches may also be shared.

The memory 718 may store program instructions that are loadable and executable on the processor(s) 720, as well as data generated during the execution of these programs. Depending on the configuration and type of the node(s) 702*a*-702*h*, the memory 718 may be volatile (such as RAM) and/or non-volatile (such as ROM, flash memory, etc.). The memory 718 may include an operating system 728, one or more data stores 730, one or more application programs 732, one or more drivers 734, and/or services for implementing the features disclosed herein.

The operating system 728 may support nodes 702*a*-702*h* basic functions, such as scheduling tasks, executing applications, and/or controller peripheral devices. In some implementations, a service provider computer may host one or more virtual machines. In these implementations, each virtual machine may be configured to execute its own operating system. Examples of operating systems include Unix, Linux, Windows, Mac OS, IOS, Android, and the like. The operating system 728 may also be a proprietary operating system.

The data stores 730 may include permanent or transitory data used and/or operated on by the operating system 728, application programs 732, or drivers 734. Examples of such data include web pages, video data, audio data, images, user data, and so on. The information in the data stores 730 may, in some implementations, be provided over the network(s) 708 to user devices 704. In some cases, the data stores 730 may additionally or alternatively include stored application programs and/or drivers. Alternatively or additionally, the data stores 730 may store standard and/or proprietary software libraries, and/or standard and/or proprietary application user interface (API) libraries. Information stored in the data stores 730 may be machine-readable object code, source code, interpreted code, or intermediate code.

The drivers 734 include programs that may provide communication between components in a node. For example, some drivers 734 may provide communication between the operating system 728 and additional storage 722, network device 724, and/or I/O device 726. Alternatively or additionally, some drivers 734 may provide communication between application programs 732 and the operating system 728, and/or application programs 732 and peripheral devices accessible to the service provider computer. In many cases, the drivers 734 may include drivers that provide well-understood functionality (e.g., printer drivers, display drivers, hard disk drivers, Solid State Device drivers). In other cases, the drivers 734 may provide proprietary or specialized functionality.

The service provider computer(s) or servers may also include additional storage 722, which may include removable storage and/or non-removable storage. The additional storage 722 may include magnetic storage, optical disks, solid state disks, flash memory, and/or tape storage. The additional storage 722 may be housed in the same chassis as the node(s) 702*a*-702*h* or may be in an external enclosure. The memory 718 and/or additional storage 722 and their associated computer-readable media may provide non-volatile storage of computer-readable instructions, data structures, program modules, and other data for the computing devices. In some implementations, the memory 718 may include multiple different types of memory, such as SRAM, DRAM, or ROM.

The memory 718 and the additional storage 722, both removable and non-removable, are examples of computer-readable storage media. For example, computer-readable storage media may include volatile or non-volatile, removable or non-removable media implemented in a method or technology for storage of information, the information including, for example, computer-readable instructions, data structures, program modules, or other data. The memory 718 and the additional storage 722 are examples of computer storage media. Additional types of computer storage media that may be present in the node(s) 702*a*-702*h* may include, but are not limited to, PRAM, SRAM, DRAM, RAM, ROM, EEPROM, flash memory or other memory technology, CD-ROM, DVD or other optical storage, magnetic cassettes, magnetic tape, magnetic disk storage or other magnetic storage devices, solid state drives, or some other medium which can be used to store the desired information and which can be accessed by the node(s) 702*a*-702*h*. Computer-readable media also includes combinations of any of the above media types, including multiple units of one media type.

Alternatively or additionally, computer-readable communication media may include computer-readable instructions, program modules or other data transmitted within a data signal, such as a carrier wave or other transmission. However, as used herein, computer-readable storage media does not include computer-readable communication media.

The node(s) 702*a*-702*h* may also include I/O device(s) 726, such as a keyboard, a mouse, a pen, a voice input device, a touch input device, a display, speakers, a printer, and the like. The node(s) 702*a*-702*h* may also include one or more communication channels 736. A communication channel 736 may provide a medium over which the various components of the node(s) 702*a*-702*h* can communicate. The communication channel or channels 736 may take the form of a bus, a ring, a switching fabric, or a network.

The node(s) 702*a*-702*h* may also contain network device(s) 724 that allow the node(s) 702*a*-702*h* to communicate with a stored database, another computing device or server, user terminals and/or other devices on the network(s) 700. The network device(s) 724 of FIG. 7 may include similar components discussed with reference to the network device 600 of FIG. 6.

In some implementations, the network device 724 is a peripheral device, such as a PCI-based device. In these implementations, the network device 724 includes a PCI interface for communicating with a host device. The term "PCI" or "PCI-based" may be used to describe any protocol in the PCI family of bus protocols, including the original PCI standard, PCI-X, Accelerated Graphics Port (AGP), and PCI-Express (PCIe) or any other improvement or derived protocols that are based on the PCI protocols discussed herein. The PCI-based protocols are standard bus protocols for connecting devices, such as a local peripheral device to a host device. A standard bus protocol is a data transfer protocol for which a specification has been defined and adopted by various manufacturers. Manufacturers ensure that compliant devices are compatible with computing systems implementing the bus protocol, and vice versa. As used herein, PCI-based devices also include devices that communicate using Non-Volatile Memory Express (NVMe). NVMe is a device interface specification for accessing non-volatile storage media attached to a computing system using PCIe. For example, the bus interface module 608 may implement NVMe, and the network device 724 may be connected to a computing system using a PCIe interface.

A PCI-based device may include one or more functions. A "function" describes operations that may be provided by the network device 724. Examples of functions include mass storage controllers, network controllers, display controllers, memory controllers, serial bus controllers, wireless controllers, and encryption and decryption controllers, among others. In some cases, a PCI-based device may include more than one function. For example, a PCI-based device may provide a mass storage controller and a network adapter. As another example, a PCI-based device may provide two storage controllers, to control two different storage resources. In some implementations, a PCI-based device may have up to eight functions.

In some implementations, the network device 724 may include single-root I/O virtualization (SR-IOV). SR-IOV is an extended capability that may be included in a PCI-based device. SR-IOV allows a physical resource (e.g., a single network interface controller) to appear as multiple resources (e.g., sixty-four network interface controllers). Thus, a PCI-based device providing a certain functionality (e.g., a network interface controller) may appear to a device making use of the PCI-based device to be multiple devices providing the same functionality. The functions of an SR-IOV-capable storage adapter device may be classified as physical functions (PFs) or virtual functions (VFs). Physical functions are fully featured functions of the device that can be discovered, managed, and manipulated. Physical functions have configuration resources that can be used to configure or control the storage adapter device. Physical functions include the same configuration address space and memory address space that a non-virtualized device would have. A physical function may have a number of virtual functions associated with it. Virtual functions are similar to physical functions, but are light-weight functions that may generally lack configuration resources, and are generally controlled by the configuration of their underlying physical functions. Each of the physical functions and/or virtual functions may be assigned to a respective thread of execution (such as for example, a virtual machine) running on a host device.

The modules described herein may be software modules, hardware modules or a suitable combination thereof. If the modules are software modules, the modules can be embodied on a non-transitory computer readable medium and processed by a processor in any of the computer systems described herein. It should be noted that the described processes and architectures can be performed either in real-time or in an asynchronous mode prior to any user interaction. The modules may be configured in the manner suggested in FIG. 6, FIG. 7, and/or functions described herein can be provided by one or more modules that exist as separate modules and/or module functions described herein can be spread over multiple modules.

The specification and drawings are, accordingly, to be regarded in an illustrative rather than a restrictive sense. It will, however, be evident that various modifications and changes may be made thereunto without departing from the broader spirit and scope of the disclosure as set forth in the claims.

Other variations are within the spirit of the present disclosure. Thus, while the disclosed techniques are susceptible to various modifications and alternative constructions, certain illustrated embodiments thereof are shown in the drawings and have been described above in detail. It should be understood, however, that there is no intention to limit the disclosure to the specific form or forms disclosed, but on the contrary, the intention is to cover all modifications, alternative constructions, and equivalents falling within the spirit and scope of the disclosure, as defined in the appended claims.

The use of the terms "a" and "an" and "the" and similar referents in the context of describing the disclosed embodiments (especially in the context of the following claims) are to be construed to cover both the singular and the plural, unless otherwise indicated herein or clearly contradicted by context. The terms "comprising," "having," "including," and "containing" are to be construed as open-ended terms (i.e., meaning "including, but not limited to,") unless otherwise noted. The term "connected" is to be construed as partly or wholly contained within, attached to, or joined together, even if there is something intervening. Recitation of ranges of values herein are merely intended to serve as a shorthand method of referring individually to each separate value falling within the range, unless otherwise indicated herein and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate embodiments of the disclosure and does not pose a limitation on the scope of the disclosure unless otherwise claimed. No language in the specification should be construed as indicating any non-claimed element as essential to the practice of the disclosure.

Disjunctive language such as the phrase "at least one of X, Y, or Z," unless specifically stated otherwise, is intended to be understood within the context as used in general to present that an item, term, etc., may be either X, Y, or Z, or any combination thereof (e.g., X, Y, and/or Z). Thus, such disjunctive language is not generally intended to, and should not, imply that certain embodiments require at least one of X, at least one of Y, or at least one of Z to each be present.

Various embodiments of this disclosure are described herein, including the best mode known to the inventors for carrying out the disclosure. Variations of those embodiments may become apparent to those of ordinary skill in the art upon reading the foregoing description. The inventors expect skilled artisans to employ such variations as appropriate and the inventors intend for the disclosure to be practiced otherwise than as specifically described herein. Accordingly, this disclosure includes all modifications and equivalents of the subject matter recited in the claims appended hereto as permitted by applicable law. Moreover, any combination of the above-described elements in all possible variations thereof is encompassed by the disclosure unless otherwise indicated herein or otherwise clearly contradicted by context.

What is claimed is:

1. A method for clock synchronization between a local device and a remote device over a network, the method comprising:

computing a set of local time shift estimates, wherein each local time shift is computed by:

transmitting a first packet from the local device to the remote device, wherein the first packet is a data packet or a control packet;

receiving a second packet containing an acknowledgement for the first packet, the second packet further containing a first time stamp representing a time of transmission of the first packet based on a local clock of the local device, a second time stamp representing a time of reception of the first packet at the remote device based on a remote clock of the remote device, and a third time stamp representing a time of transmission of the second packet based on the remote clock;

determining a fourth time stamp representing a time of reception of the second packet at the local device based on the local clock; and computing half of a difference between:

a first elapsed time from the first time stamp to the second time stamp; and a second elapsed time from the third time stamp to the fourth time stamp;

computing a cumulative average local time shift from the set of local time shift estimates;

computing an overall time shift based on an average of the cumulative average local time shift and a cumulative average remote time shift determined by the remote device, wherein the cumulative average local time shift excludes local time shift estimates corresponding to round trip times above a threshold percentile, or corresponding to packet sizes above a threshold packet size; and synchronizing the local clock to the remote clock based on the overall time shift.

2. The method of claim 1, wherein packet transfers between the local device and the remote device are performed using a multi-path transport protocol.

3. The method of claim 1, wherein the overall time shift is updated continuously, or at a periodic interval.

4. The method of claim 1, wherein the first packet is the data packet with a variable length, and the first elapsed time is adjusted based on a length of the first packet.

5. A method, comprising:

sending, from a local device, a first packet to a remote device over a network, the first packet including a first time stamp representing a time of transmission of the first packet at the local device based on a local clock of the local device;

receiving, from the remote device, a second packet containing an acknowledgement for the first packet, the second packet further comprising the first time stamp, a second time stamp representing a time of reception of the first packet at the remote device based on a remote clock of the remote device, and a third time stamp representing a time of transmission of the second packet based on the remote clock;

computing a local time shift estimate representing a difference between the local clock and the remote clock based on the first time stamp, the second time stamp, the third time stamp, and a fourth time stamp representing a time of reception of the second packet at the local device based on the local clock; and determining an overall time shift between the local clock and the remote clock based on a cumulative average local time shift computed from the local time shift estimate and previously computed local time shift estimates, wherein the overall time shift is updated based on a weighted sum of previously determined overall time shifts.

6. The method of claim 5, wherein the local time shift estimate is computed further based on a size of the first packet and a reception bandwidth of the remote device.

7. The method of claim 5, wherein the local time shift estimate is computed further based on a latency between recording the first time stamp for the first packet and transmitting a first bit of the first packet onto the network.

8. The method of claim 5, wherein the overall time shift is determined by averaging the cumulative average local time shift and a cumulative average remote time shift determined by the remote device.

9. The method of claim 5, wherein the first packet and the second packet are transmitted over the network using a multi-path transport protocol.

10. The method of claim 5, wherein the cumulative average local time shift excludes local time shift estimates corresponding to round trip times above a threshold percentile.

11. The method of claim 5, wherein the cumulative average local time shift excludes local time shift estimates corresponding to packet sizes above a threshold packet size.

12. The method of claim 5, wherein the overall time shift is determined continuously, or at a periodic interval.

13. A local network device, comprising:

a time stamp generator configured to:

generate a first time stamp representing a time of transmission of a first packet at the local network device based on a local clock of the local network device;

a transmitter (TX) interface configured to:

send the first packet to a remote network device over a network, the first packet including the first time stamp;

a receiver (RX) interface configured to:

receive a second packet containing an acknowledgement for the first packet from the remote network device, the second packet further comprising the first time stamp, a second time stamp representing a time of reception of the first packet at the remote network device based on a remote clock of the remote network device, and a third time stamp representing a time of transmission of the second packet based on the remote clock, the time stamp generator further configured to:

generate a fourth time stamp representing a time of reception of the second packet at the local network device based on the local clock; and a time shift estimator configured to:

compute a local time shift estimate representing a difference between the local clock and the remote clock based on the first time stamp, the second time stamp, the third time stamp, and the fourth time stamp; and determine an overall time shift between the local clock and the remote clock based on a cumulative average local time shift computed from the local time shift estimate and previously computed local time shift estimates, wherein the cumulative average local time shift excludes local time shift estimates corresponding to round trip times above a threshold percentile, or corresponding to packet sizes above a threshold packet size.

14. The local network device of claim 13, wherein the first packet is a data packet, and the time shift estimator computes the local time shift estimate based on a size of the data packet and a data reception bandwidth of the remote network device.

15. The local network device of claim 13, wherein the time shift estimator computes the local time shift estimate based on a latency between recording the first time stamp for the first packet and transmitting a first bit of the first packet onto the network.

16. The local network device of claim 13, wherein the time shift estimator determines the overall time shift by averaging the cumulative average local time shift and a cumulative average remote time shift determined by the remote network device.

17. The local network device of claim 13, wherein the time shift estimator determines the overall time shift continuously, or at a periodic interval.

18. The local network device of claim 13, wherein the time shift estimator updates the overall time shift based on a weighted sum of previously determined overall time shifts.

19. The local network device of claim 13, wherein the first time stamp is included in a packer header of the first packet.

20. The local network device of claim 13, wherein the first, second, and third time stamps are included in a packer header of the second packet.

* * * * *